(12) United States Patent
Kitamura et al.

(10) Patent No.: US 6,687,960 B2
(45) Date of Patent: Feb. 10, 2004

(54) BOOT BAND

(75) Inventors: Yoshiharu Kitamura, Atsugi (JP);
Takashi Ogino, Kamiina-gun (JP);
Yoshihiro Hemmi, Komagane (JP)

(73) Assignee: NHK Spring, Co., Ltd., Kanagawa (JP)

( * ) Notice: Subject to any disclaimer, the term of this patent is extended or adjusted under 35 U.S.C. 154(b) by 0 days.

(21) Appl. No.: 10/336,323

(22) Filed: Jan. 3, 2003

(65) Prior Publication Data

US 2003/0101544 A1 Jun. 5, 2003

Related U.S. Application Data

(63) Continuation of application No. PCT/JP01/05515, filed on Jun. 27, 2001.

(30) Foreign Application Priority Data

Jul. 5, 2000 (JP) ......................... 2000-204056

(51) Int. Cl.$^7$ ................... B65D 63/04; B23P 19/02; F16L 33/02
(52) U.S. Cl. ................. 24/20 R; 24/20 CW; 24/20 EE; 24/20 W; 24/23 EE
(58) Field of Search ........................ 24/20 R, 20 CW, 24/20 TT, 20 EE, 20 W, 20 S, 20 LS, 19, 23 EE

(56) References Cited

U.S. PATENT DOCUMENTS

| 4,987,651 | A | | 1/1991 | Oetiker | |
|---|---|---|---|---|---|
| 5,105,509 | A | * | 4/1992 | Lilley | 24/20 R |
| 5,487,209 | A | * | 1/1996 | Oetiker | 24/20 R |
| 6,481,062 | B1 | * | 11/2002 | Jan | 24/20 CW |
| 6,560,824 | B1 | * | 5/2003 | Kitamura et al. | 24/20 CW |

FOREIGN PATENT DOCUMENTS

JP 8-159108 6/1996

OTHER PUBLICATIONS

International Preliminary Examination Report dated Feb. 4, 2002.

* cited by examiner

Primary Examiner—Victor Sakran
(74) Attorney, Agent, or Firm—Scully, Scott, Murphy & Presser

(57) ABSTRACT

A boot band includes a locking hole formed in an outer overlapping portion of a band body, a locking nail formed on an inner overlapping portion, and an ear portion which can be plastically deformed into a shape that decreases the circumferential length of the band body. When being inserted in the locking hole, the locking nail can move between an engaging position to engage with a ridge of the locking hole and a disengaging position to disengage from the ridge. A narrow portion is formed at an intermediate portion in the longitudinal direction of the locking hole to restrain the locking nail from returning from the engaging position to the disengaging position side.

8 Claims, 9 Drawing Sheets

BOOT BAND

CROSS-REFERENCE TO RELATED APPLICATIONS

This is a Continuation Application of PCT Application No. PCT/JP01/05515, filed Jun. 27, 2001, which was not published under PCT Article 21(2) in English.

This application is based upon and claims the benefit of priority from the prior Japanese Patent Application No. 2000-204056, filed Jul. 5, 2000, the entire contents of which are incorporated herein by reference.

BACKGROUND OF THE INVENTION

1. Field of the Invention

The present invention relates to a boot band used for fixing a boot made of rubber, a resin, or the like to a target member.

2. Description of the Related Art

A boot made of rubber, a resin, or the like is used as one component in a vehicle or the like. In this specification, boots are cylindrical members such as hoses, tubes, etc., e.g. a bellow type resin boot. Conventionally, a boot band made of metal has been used to fix such a boot to a target member. As a boot band of this kind, an open-ended metal band body is rounded like a ring and mounted on a fastening target surface is known, as described in, e.g., U.S. Pat. No. 1,818,559.

For example, a conventional boot band 1 shown in FIG. 19 has a belt-like metal band body 2 which is to be rounded like a ring. Locking nails 4 formed on an inner overlapping portion 2b are caught by locking holes 3 formed in an outer overlapping portion 2a of the band body 2. An ear portion 5 which can be plastically deformed into a shape that decreases the circumferential length of the band body 2 is formed on part of the band body 2 in the circumferential direction. The locking nails 4 are inserted in the locking holes 3, so this boot band 1 is placed on a target fastening surface 6a at a predetermined position of a boot 6. Then, the ear portion 5 is plastically deformed. As a hard target connection member 7 made of metal or the like is present inside the boot 6, the outer diameter of the boot 6 is suppressed from decreasing.

With the boot band 1 of this kind, if the boot band 1 cannot be applied on the target fastening surface 6a with its locking nails 4 being engaged with the locking holes 3, it is positioned on the target fastening surface 6a with the locking nails 4 being disengaged from the locking holes 3, and the locking nails 4 can be engaged with the locking holes 3 in this state. Hence, the shape and the like of the locking nails 4 are designed such that the locking nails 4 can be inserted in or disengaged from the locking holes 3 on the target fastening surface 6a. Usually, the width of each locking hole 3 is larger than that of the corresponding locking nail 4.

To caulk the ear portion 5 of the boot band 1, the boot band 1 is placed on the target fastening surface 6a, and after that the ear portion 5 is plastically deformed by a caulking jig (not shown). When performing this assembly operation, if the inner overlapping portion 2b moves due to some external force in a direction to decrease the circumferential length of the band body 2, the locking holes 3 and locking nails 4 are sometimes disengaged from each other. If the locking holes 3 and locking nails 4 are disengaged, the outer overlapping portion 2a may be separated from the inner overlapping portion 2b, or the band body 2 may be displaced from the predetermined position on the target fastening surface 6a, and accordingly normal assembly cannot be performed.

With the locking nails 4 and locking holes 3 being engaged with each other, when the boot band 1 is to be transported or stored in stock, if some external force or vibration acts on the band body 2, the locking nails 4 may be disengaged from the locking holes 3.

The band described in Jpn. Pat. Appln. KOKOKU Publication No. 8-30484 practices an arrangement in which, after a support projection formed on a belt-like member is inserted in a hole, the support projection is bent (caulked) in the widthwise direction of the belt-like member, so that the inner overlapping portion and the outer overlapping portion will not separate from each other. The band of this kind requires, however, in addition to the step of deforming the ear portion, the step of caulking the support projection. Hence, the number of processing steps is large, and the cost is high. Once the support projection is caulked, the band cannot be removed from the target fastening surface, or the removed band cannot be placed on the target fastening surface again. This causes a problem in workability.

It is, therefore, an object of the present invention to provide a boot band in which the locking nail will not be accidentally disengaged from the locking hole during assembly, transportation, or stock, and the locking nail and locking hole can be engaged or disengaged when necessary.

BRIEF SUMMARY OF THE INVENTION

A boot band according to the present invention, which achieves the above object, comprises a locking hole formed in an outer overlapping portion of a band body, a locking nail which is formed on an inner overlapping portion of the band body and, when being inserted in the locking hole, can move in a longitudinal direction of the locking hole between an engaging position to engage with a ridge of the locking hole and a disengaging position to disengage from the ridge, and an ear portion which is formed on part of the band body and can be plastically deformed into a shape that decreases a circumferential length of the rounded band body, wherein a narrow portion is formed at an intermediate portion in the longitudinal direction of the locking hole to restrain the locking nail from returning from the engaging position to a disengaging position.

In the boot band according to the present invention, after the locking nail is inserted in the locking hole from the disengaging position side, it is moved to the engaging position through the narrow portion. The moment the locking nail passes through the narrow portion, a feeling of click stop is produced. The fact that the locking nail has reached the engaging position can be sensed by touch of hands that handle the boot band.

When the locking nail moves to the engaging position as described above, it engages with the ridge of the locking hole. In this state, even if a force acts in a direction to decrease the circumferential direction of the band body, the narrow portion prevents the locking nail from returning to the disengaging position. This locking nail can pass through the narrow portion and move to the disengaging position only when a force equal to a predetermined limit or more is applied in the direction toward the disengaging position.

According to the present invention, the locking nail and locking hole can be prevented from being disengaged from each other. When the locking nail is to be engaged with the locking hole, a feeling of click stop is produced as the locking nail passes through the narrow portion. Thus, the fact that the locking nail has reached the engaging position can be sensed by feel, by hands that handle the boot band. The boot band according to the present invention can also avoid problems such as disengagement of the locking nail and locking hole during transportation. In addition, before caulking the ear portion, the boot band can be removed from the target fastening surface, and the boot band can be attached again to the target fastening surface when necessary.

In the present invention, the width of the narrow portion at the narrowest portion may be set smaller than the width of the locking nail by 0.05 mm to 0.15 mm. According to the present invention, the locking nail inserted in the locking hole can be moved easily from the disengaging position toward the engaging position, and can be prevented from returning from the engaging position to the disengaging position.

A perpendicular surface may be formed on an outer surface of the locking nail to be perpendicular to a surface of the band body in a direction of thickness. The perpendicular surface may be brought into contact with an inner side surface of the narrow portion. The perpendicular surface reliably supports the locking nail with the narrow portion. The perpendicular surface can also prevent the outer overlapping portion from being displaced in a direction to separate from the inner overlapping portion when the locking nail comes into contact with the narrow portion. According to the present invention, as the perpendicular surface formed on the locking nail is brought into contact with the inner side surface of the narrow portion, the locking nail can be reliably received in the narrow portion. Also, the outer overlapping portion of the band body is suppressed from separating from the inner overlapping portion.

In the present invention, a tilted guide surface may be formed on an inner side surface of the locking hole to gradually decrease the width of the locking hole from the disengaging position toward the narrow portion. With this arrangement, the locking nail passes through the narrow portion smoothly while moving along the tilted guide surface, and reaches the engaging position. According to the present invention, the locking nail inserted in the locking hole can be moved further smoothly from the disengaging position toward the engaging position.

In order to achieve the above object, a boot band according to another aspect of the present invention comprises a locking hole formed in an outer overlapping portion of a band body, a locking nail which is formed on an inner overlapping portion of the band body and, when being inserted in the locking hole, can move in a longitudinal direction of the locking hole between an engaging position to engage with a ridge of the locking hole and a disengaging position to disengage from the ridge, an elongated hole which is formed in the outer overlapping portion and extends in the longitudinal direction of the band body, and a projection which is formed on the inner overlapping portion and to be inserted in the elongated hole, the projection serving to move to a front end side of the elongated hole when the locking nail moves to the engaging position, and to a rear end side of the elongated hole when the locking nail moves to the disengaging position, wherein a narrow portion is formed at an intermediate portion in the longitudinal direction of the elongated hole to restrain the projection from returning from the front end side to the rear end side of the elongated hole.

In the boot band according to the present invention, the projection is inserted in the elongated hole from the rear end side, and is then positioned on the front end side of the elongated hole through the narrow portion. Hence, the locking nail engages with the locking hole. The moment the projection passes through the narrow portion, a feeling of click stop is produced. The projection that has moved to the front end side of the elongated hole can be returned to the rear end side through the narrow portion only when a certain force or more is applied to it.

In the present invention, the width of the narrow portion at the narrowest portion may be set smaller than the width of the projection by 0.05 mm to 0.15 mm. According to the present invention, the projection inserted in the elongated hole can be easily moved from the disengaging position toward the engaging position, and can be prevented from returning from the engaging position to the disengaging position.

A perpendicular surface may be formed on an outer surface of the projection, perpendicular to a surface of the band body in a direction of thickness. The perpendicular surface may be brought into contact with an inner side surface of the narrow portion. The perpendicular surface reliably supports the projection with the narrow portion. The perpendicular surface can also prevent the outer overlapping portion from separating from the inner overlapping portion when the projection comes into contact with the narrow portion. According to the present invention, as the perpendicular surface formed on the projection is brought into contact with the inner side surface of the narrow portion, the projection can be reliably accepted by the narrow portion. Also, the outer overlapping portion of the band body can be suppressed from separating from the inner overlapping portion.

In the present invention, a tilted guide surface may be formed on an inner side surface of the elongated hole to gradually decrease a width of the elongated hole from the rear end side of the elongated hole toward the narrow portion. With this arrangement, the projection passes through the narrow portion smoothly while moving along the tilted guide surface, and reaches the front end side of the elongated hole. According to the present invention, the projection inserted in the elongated hole can be moved further smoothly from the disengaging position toward the engaging position.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A boot band according to the first embodiment of the present invention will be described with reference to FIGS. 1 to 10.

Figure 1:
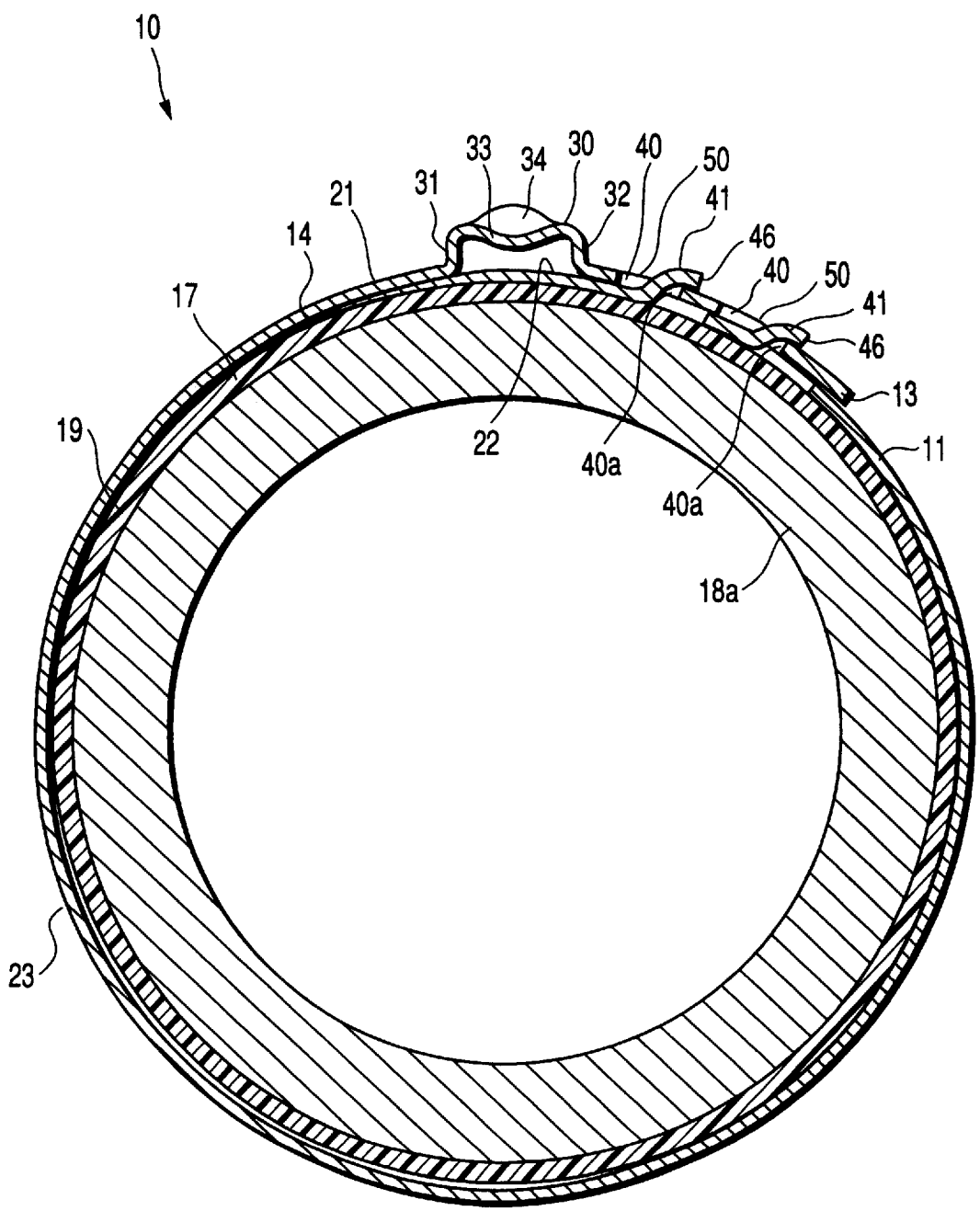
FIG. 1 is a sectional view of a boot band, a boot, and a target connection member according to the first embodiment of the present invention.

A boot band 10 shown in FIG. 1 has a band body 11 formed of a belt-like member made of metal (e.g., stainless steel). Both ends of the band body 11 in the longitudinal direction form open first and second ends 13 and 14. The band body 11 is rounded like a ring such that the first end 13 is located on the outer side.

Figure 10:
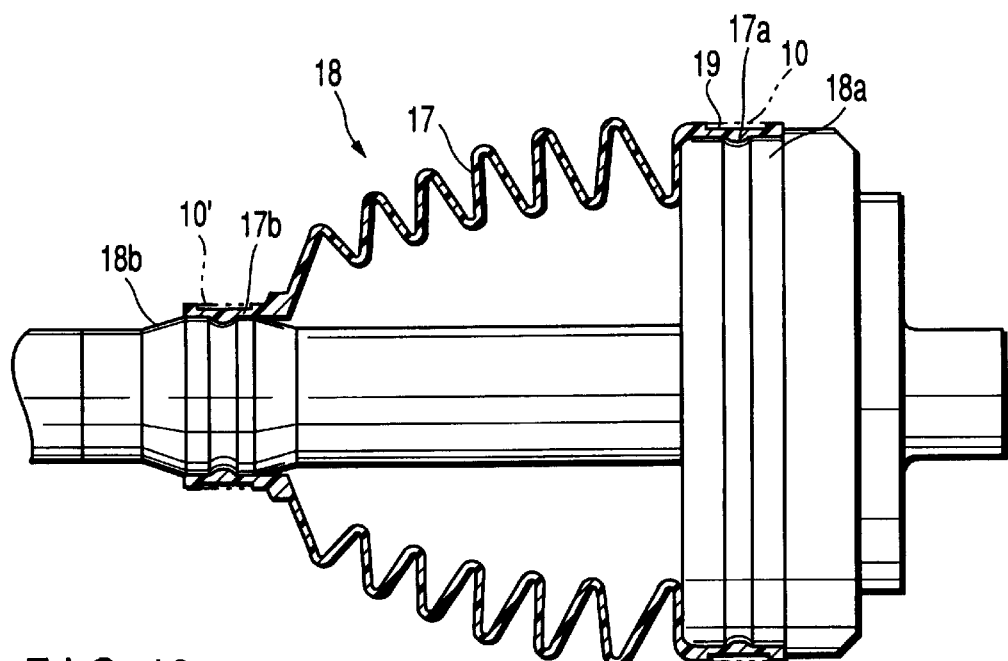
FIG. 10 is a sectional view showing a boot and a target connection member.

An example of a boot 17 is a bellow-like resin boot to be formed on a joint portion 18 of a vehicle power transmission system as shown in FIG. 10. One end 17a of the boot 17 is fixed to a target connection member 18a of the joint portion 18 with the boot band 10. The boot band 10 is mounted on a target fastening surface 19 of the boot 17. The target connection member 18a made of metal is a rigid body which will not be deformed by the fastening force of the boot band 10. In contrast to this, the boot 17 can be deformed elastically.

The other end 17b of the boot 17 is fixed to a shaft member 18b with a boot band 10' having a smaller diameter than that of the boot band 10 which is to be described in this embodiment. The construction of the small-diameter boot band 10' is basically the same as the large-diameter boot band 10. Hence, in this specification, the large-diameter boot band 10 will be described.

Figure 8:
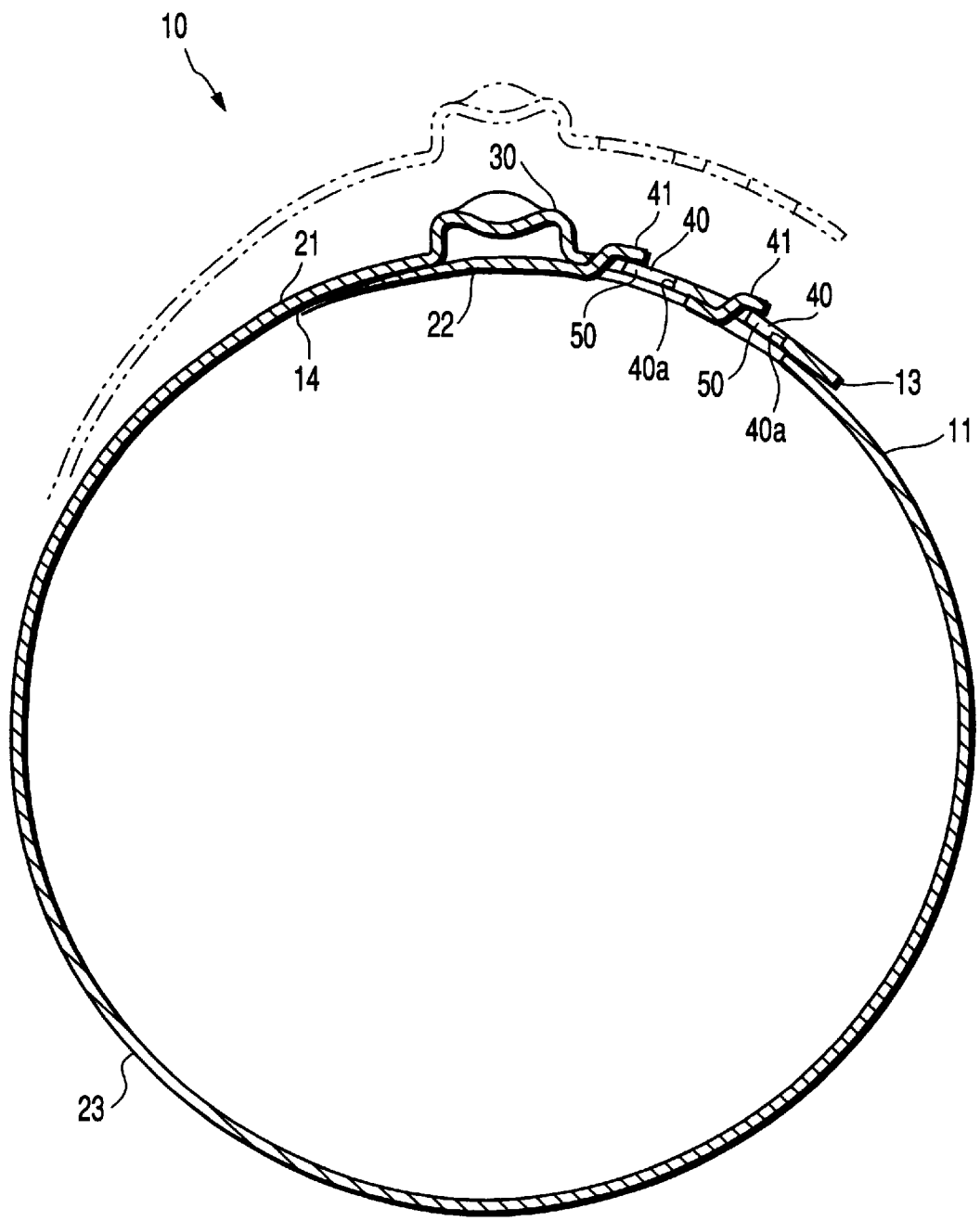
FIG. 8 is a sectional view showing a state before the boot band shown in FIG. 1 is attached to a target fastening surface.

The band body 11 rounded like a ring as shown in FIG. 1 has an outer overlapping portion 21 positioned near the first end 13, an inner overlapping portion 22 positioned near the second end 14, and an intermediate portion 23 (not overlapped) in the longitudinal direction which is positioned between the overlapping portions 21 and 22. The band body 11 is pre-shaped into a ring, as shown in FIG. 8.

Figure 9:
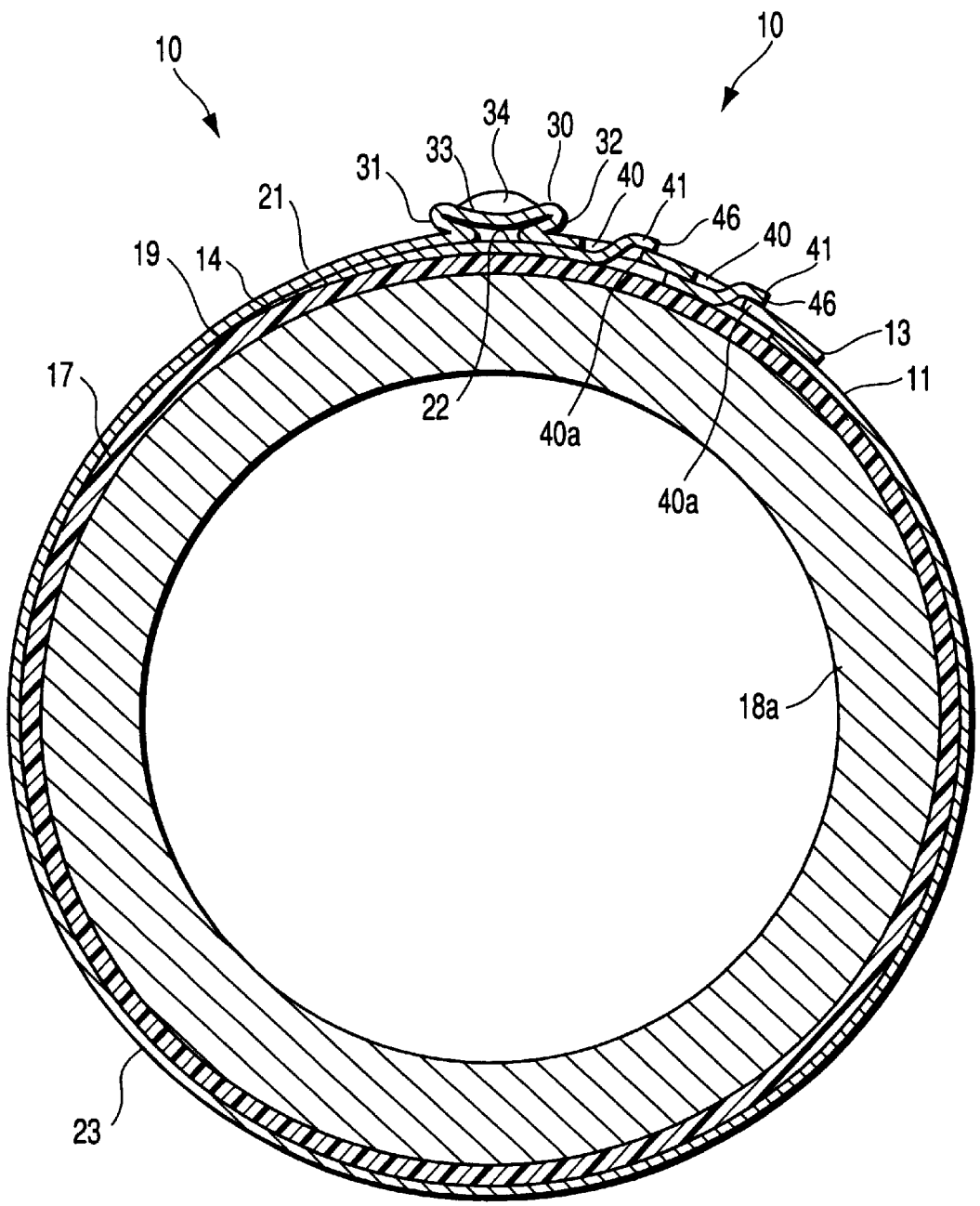
FIG. 9 is a sectional view of a state wherein the ear portion of the boot band shown in FIG. 1 is caulked.

An ear portion 30 for fastening is formed on part of the band body 11 in the longitudinal direction. The ear portion 30 includes a pair of front and rear leg portions 31 and 32 standing upright from the outer surface of the band body 11, and a bridge portion 33 extending between the leg portions 31 and 32. When the ear portion 30 is plastically deformed (caulked) as shown in FIG. 9, it can decrease the circumferential length of the band body 11. In order to increase the rigidity of the ear portion 30 after caulking, rib-like portions 34 are formed on the two sides of the bridge portion 33.

Figure 2:
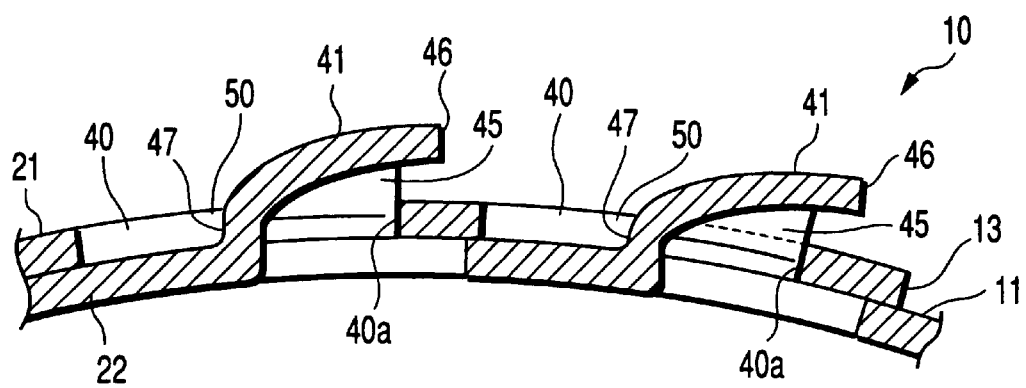
FIG. 2 is a partially enlarged sectional view of the boot band shown in FIG. 1.

In that portion of the outer overlapping portion 21 of the band body 11 which is near the first end 13, locking holes 40 are formed at a plurality of portions (e.g., two portions) of the band body 11 in the longitudinal direction. As shown in FIG. 2, the locking holes 40 extend through the band body 11 in the direction of thickness. The locking holes 40 will be described later in detail.

Figure 3:
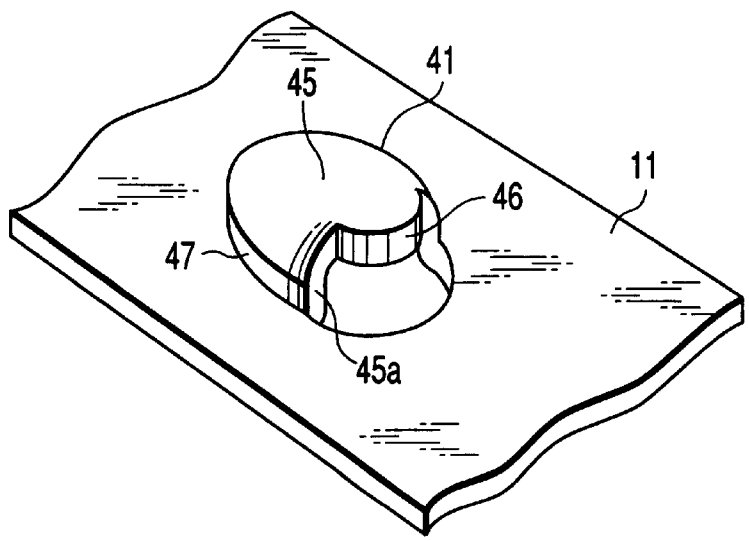
FIG. 3 is a perspective view of a locking nail of the boot band shown in FIG. 1.

A plurality of (two in the example shown in FIGS. 1 and 2) locking nails 41 are formed on the inner overlapping portion 22 at positions corresponding to the locking holes 40. The locking nails 41 project toward the outer overlapping portion 21, and can be inserted in the corresponding locking holes 40. As shown in FIG. 3, each locking nail 41 has a punched portion 45 formed like a bag by pressing in the direction of the thickness of the band body 11, and a distal end portion 46 extending from a front end 45a of the punched portion 45 toward the first end 13.

Figure 4:
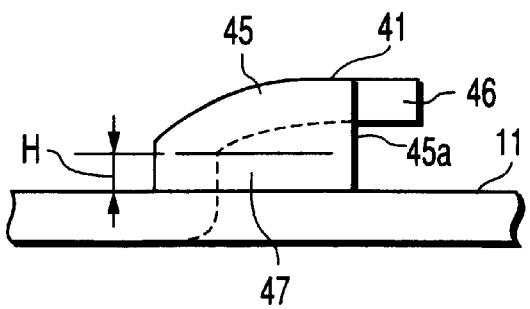
FIG. 4 is a side view of the locking nail of the boot band shown in FIG. 1.

A perpendicular surface 47 is formed on the outer surface of the punched portion 45 of the locking nail 41, to stand upright from the surface of the band body 11 at a substantially right angle in the direction of thickness, as shown in FIG. 4. The perpendicular surface 47 is in contact with the inner side surface of a narrow portion 50 (to be described later). The perpendicular surface 47 preferably has a height H almost half the thickness of the band body 11.

Figure 5:
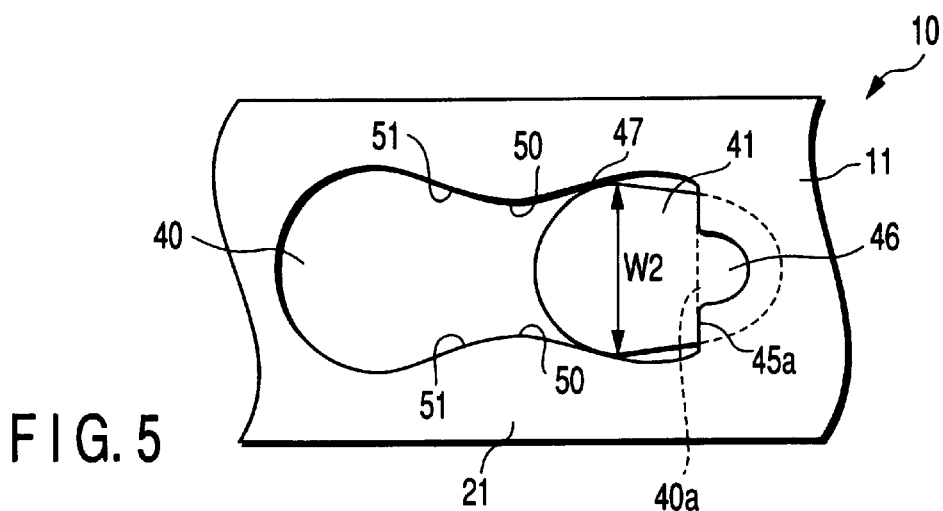
FIG. 5 is a partially enlarged plan view of the boot band shown in FIG. 1.
Figure 6:
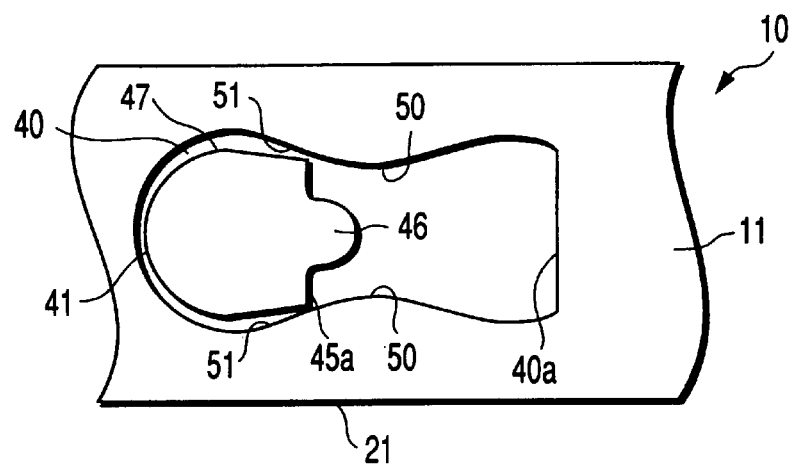
FIG. 6 is a plan view showing a state wherein the locking nail shown in FIG. 5 has moved to a disengaging position.

When the locking nail 41 is inserted in the locking hole 40, it can move in the longitudinal direction of the locking hole 40 between an engaging position where the front end 45a engages with a ridge 40a of the locking hole 40, as shown in FIG. 5, and a disengaging position where the front end 45a disengages from the ridge 40a, as shown in FIG. 6.

When the locking nail 41 is at the engaging position shown in FIG. 5, the distal end portion 46 of the locking nail 41 opposes the outer surface of the outer overlapping portion 21. Accordingly, the outer overlapping portion 21 is suppressed from separating from the inner overlapping portion 22. In other words, the locking nail 41 is prevented from disengaging from the locking hole 40.

When the locking nail 41 moves to the disengaging position shown in FIG. 6, the distal end portion 46 of the locking nail 41 no longer opposes the outer surface of the outer overlapping portion 21. Thus, the outer overlapping portion 21 can separate from the inner overlapping portion 22. In other words, the locking nail 41 and locking hole 40 can be disengaged from each other. Accordingly, in this boot band 10, the locking nails 41 can be inserted in the locking holes 40 from the disengaging position side, as shown in FIG. 8.

Figure 7:
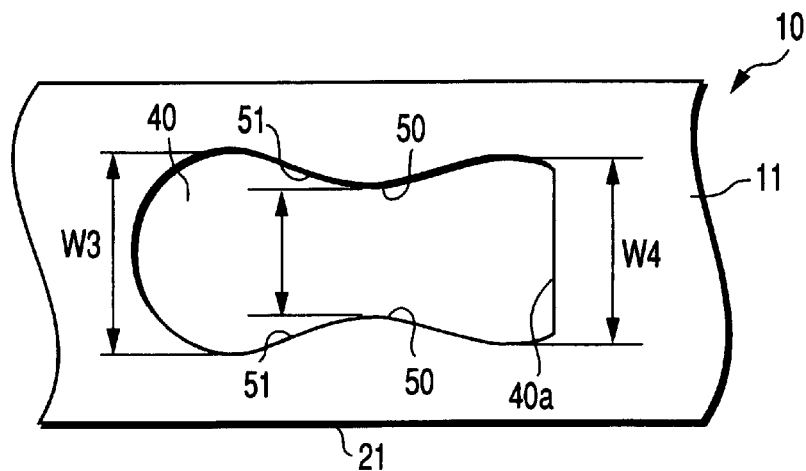
FIG. 7 is a plan view of a locking hole of the boot band shown in FIG. 1.

The narrow portion 50 is formed at the intermediate portion in the longitudinal direction of the locking holes 40. The narrow portion 50 restrains the locking nail 41 from returning from the engaging position to the disengaging position. As shown in FIG. 7, a width W1 of the narrow portion 50 at the narrowest portion is smaller than a width W2 (shown in FIG. 5) of the locking nail 41 by 0.05 mm to 0.15 mm. A width W3 and width W4 of the locking hole 40 near the disengaging position and engaging position, respectively, are larger than the width W2 of the locking nail 41. A smooth curved tilted guide surface 51 is formed on the inner side surface of the locking hole 40. The tilted guide surface 51 decreases the width of the locking hole 40 gradually from the disengaging position side toward the narrow portion 50.

The assembly procedure and the like of the boot band 10 will be described.

As shown in FIG. 8, the band body 11 is rounded such that the inner overlapping portion 22 overlaps the inner side of the outer overlapping portion 21. As shown in FIG. 6, the locking nail 41 is inserted in the locking hole 40 from the disengaging position side. Then, as shown in FIG. 5, the locking nail 41 is moved to the engaging position side of the locking hole 40. During this movement, the two side surfaces of the locking nail 41, i.e., the perpendicular surface 47, pass through the narrow portion 50 while pressing the inner side surface of the narrow portion 50 in an expanding direction, so that the locking nail 41 shifts to the engaging position. The moment the locking nail 41 passes through the narrow portion 50, the user feels click stop, so the user knows, by hands that handle the boot band 10, that the locking nail 41 has reached the engaging position.

With the locking nail 41 being engaged with the locking hole 40, the winding diameter of the band body 11 naturally increases, due to its elastic restoration force, and the outer overlapping portion 21 naturally separates from the inner overlapping portion 22. In this case, the distal end portion 46 of the locking nail 41 presses the outer surface of the outer overlapping portion 21, and engagement of the locking nail 41 and locking hole 40 is maintained. Hence, the winding diameter of the band body 11 is prevented from further enlarging, and the boot band 10 is maintained in a closed-ring state, as shown in FIG. 1.

After the locking nail 41 and locking hole 40 are engaged with each other, the ear portion 30 is plastically deformed by a caulking jig (not shown), as shown in FIG. 9, to decrease the circumferential length of the band body 11, so the target fastening surface 19 is fastened. In this manner, the boot 17 is fixed to the target connection member 18a.

In the boot band 10 of this embodiment, even if a force acts in a direction to decrease the circumferential direction of the band body 11 before the ear portion 30 is caulked, movement of the locking nail 41 toward the disengaging position can be prevented by the narrow portion 50. Hence, inconveniences such as disengagement of the locking nail 41 from the locking holes 40 during assembly or enlargement of the band body 11 can be prevented.

If the boot band 10 needs be removed from the target fastening surface 19 before caulking the ear portion 30, a force that forcibly returns the locking nail 41 from the engaging position (described above) toward the disengaging position is applied. When the locking nail 41 is moved from the narrow portion 50 to the disengaging position in this manner, the locking nail 41 and locking hole 40 can be disengaged from each other. Hence, the boot band 10 can be removed from the target fastening surface 19.

Figure 11:
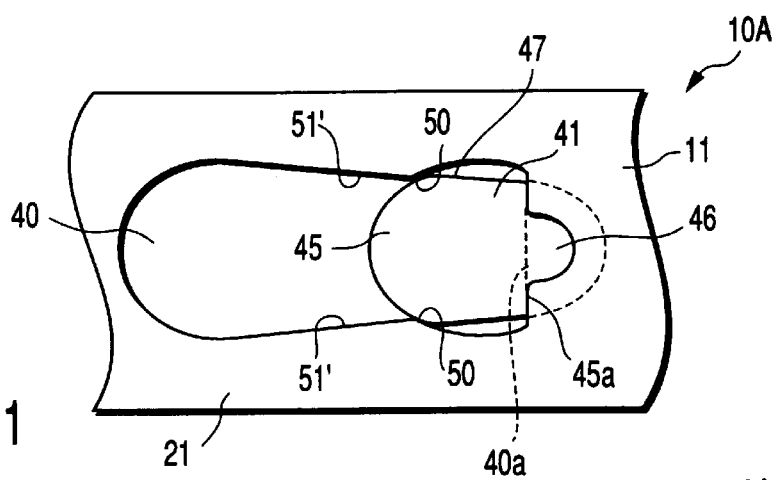
FIG. 11 is a plan view of part of a boot band according to the second embodiment of the present invention.
Figure 12:
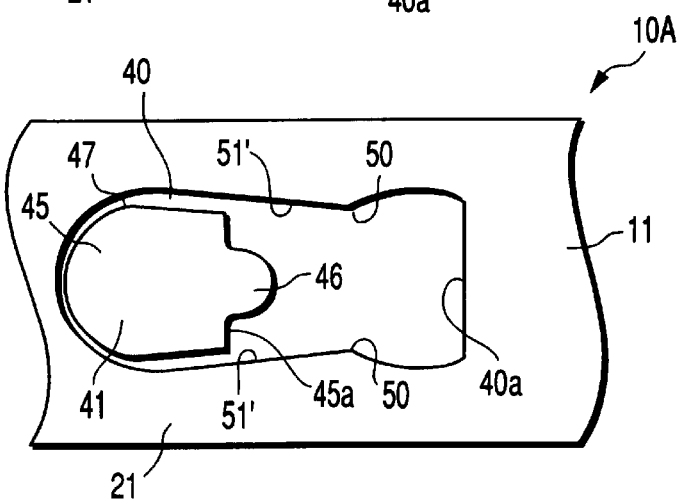
FIG. 12 is a plan view showing a state wherein the locking nail of the boot band shown in FIG. 11 has moved to a disengaging position.

FIGS. 11 and 12 show part of a boot band 10A according to the second embodiment of the present invention. This boot band 10A is common to the first embodiment except that the shape of a locking hole 40 is different from that of the boot band 10 of the first embodiment. The locking hole 40 of the boot band 10A according to the second embodiment has a tapered guide surface 51' so that its width decreases substantially linearly from the disengaging position side toward a narrow portion 50. Also, the width of the locking hole 40 increases largely from the narrow portion 50 toward the engaging position (a direction toward a ridge 40a of the locking hole 40). With the locking hole 40 having this shape, when a locking nail 41 is to be moved from the disengaging position toward the engaging position, the locking nail 41 can pass through the narrow portion 50 smoothly. After the locking nail 41 reaches the engaging position, it will not move easily toward the disengaging position side.

FIGS. 13 to 18 show a boot band 10B according to the third embodiment of the present invention. A boot band 10B of this embodiment has, in addition to a locking hole 40 and locking nail 41, an elongated hole 60 formed on an outer overlapping portion 21, and a projection 61 formed in an inner overlapping portion 22 by pressing or the like. The projection 61 is inserted in the elongated hole 60. The height of the projection 61 is almost the same as the thickness of a band body 11. The elongated hole 60 extends in the longitudinal direction of the band body 11.

Figure 13:
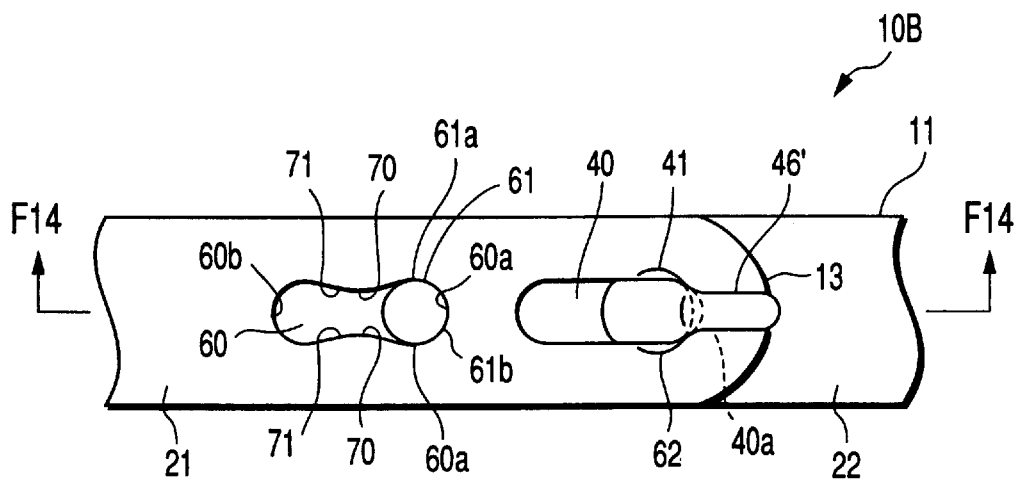
FIG. 13 is a plan view of part of a boot band according to the third embodiment of the present invention.
Figure 14:
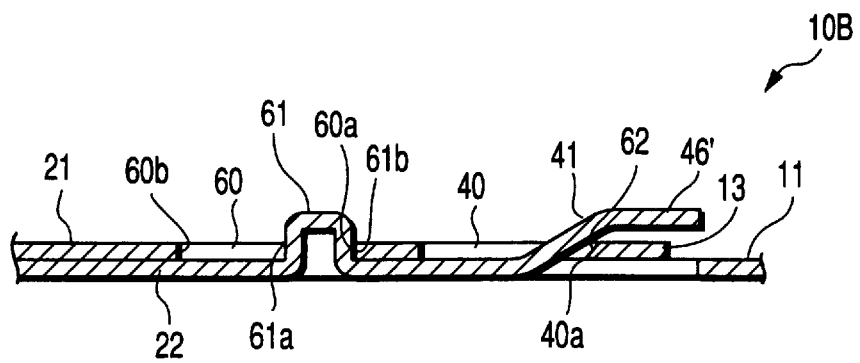
FIG. 14 is a sectional view taken along the line F14—F14 of FIG. 13.
Figure 15:
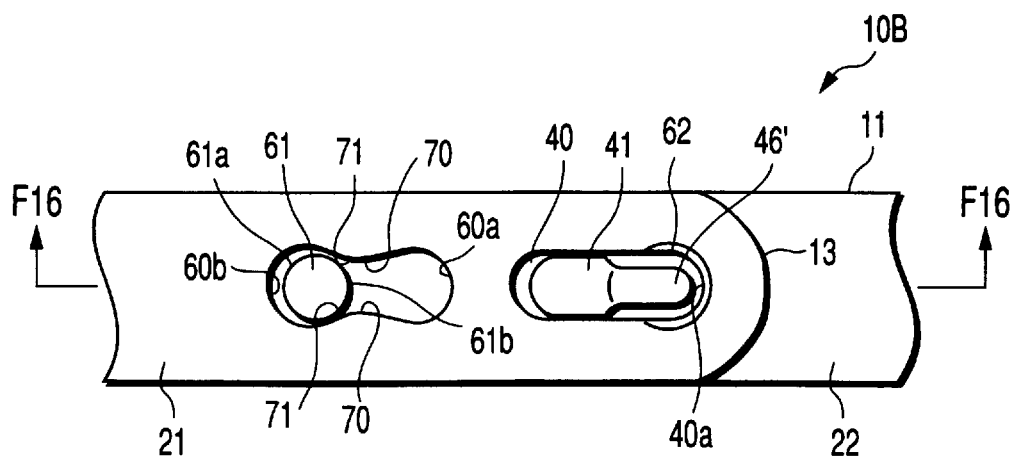
FIG. 15 is a plan view showing a state wherein the locking nail of the boot band shown in FIG. 13 has moved to a disengaging position.
Figure 16:
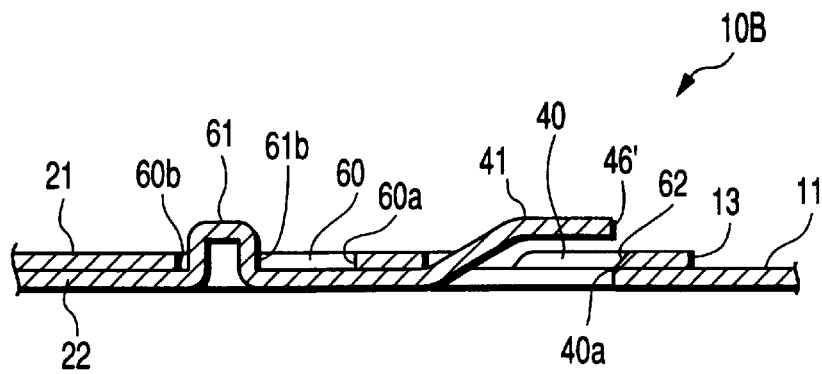
FIG. 16 is a sectional view taken along the line F16—F16 of FIG. 15.
Figure 17:
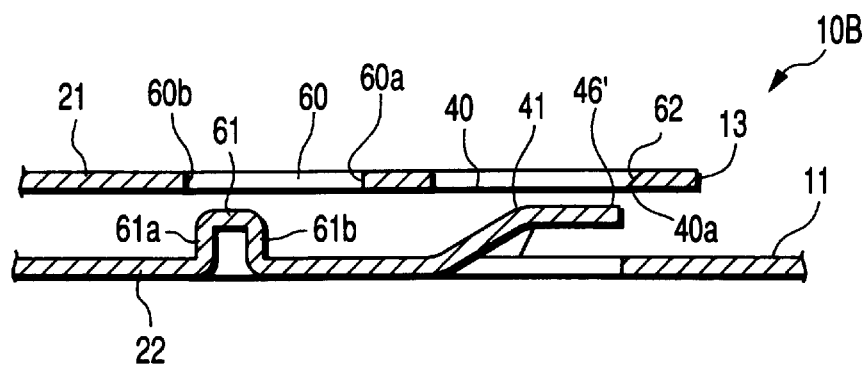
FIG. 17 is a sectional view showing a state wherein the locking nail of the boot band shown in FIG. 13 has separated from the locking hole.

When the locking nail 41 is inserted in the locking hole 40, it can move in the longitudinal direction of the locking hole 40 between an engaging position where it engages with a ridge 40a of the locking hole 40, as shown in FIGS. 13 and 14, and a disengaging position where it disengages from the ridge 40a, as shown in FIGS. 15 and 16. When the locking nail 41 moves to the engaging position (FIGS. 13 and 14), the projection 61 moves to a front end 60a side of the elongated hole 60. When the locking nail 41 moves to the disengaging position (FIGS. 15 and 16), the projection 61 moves to a rear end 60b side of the elongated hole 60. Then, the locking nail 41 can be disengaged from the locking hole 40, as shown in FIG. 17.

A tapered surface 62 is formed around the ridge 40a of the locking hole 40 by coining. The tapered surface 62 is in contact with the front surface of the locking nail 41. Thus, the outer overlapping portion 21 does not separate from the inner overlapping portion 22 easily. A distal end portion 46' of the locking nail 41 extends toward a first end 13 of the band body 11. This distal end portion 46' has such a length that when the locking nail 41 engages with the ridge 40a of the locking hole 40 (see FIG. 14), the outer overlapping portion 21 can be prevented from separating from the inner overlapping portion 22.

Figure 18:
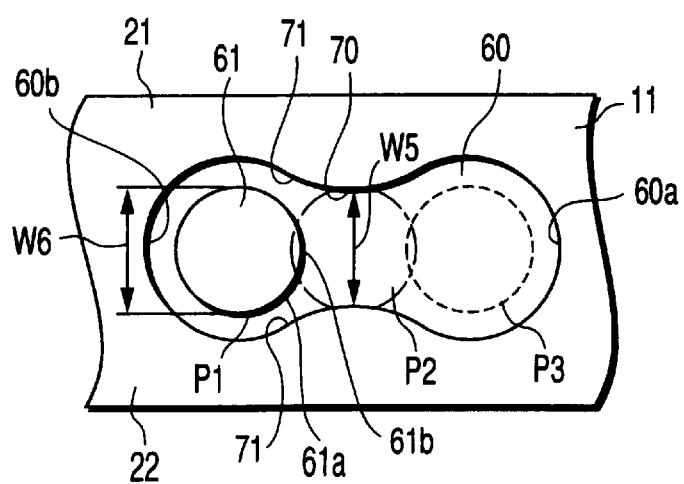
FIG. 18 is a plan view schematically showing the locking nail and locking hole of the boot band shown in FIG. 13.
Figure 19:
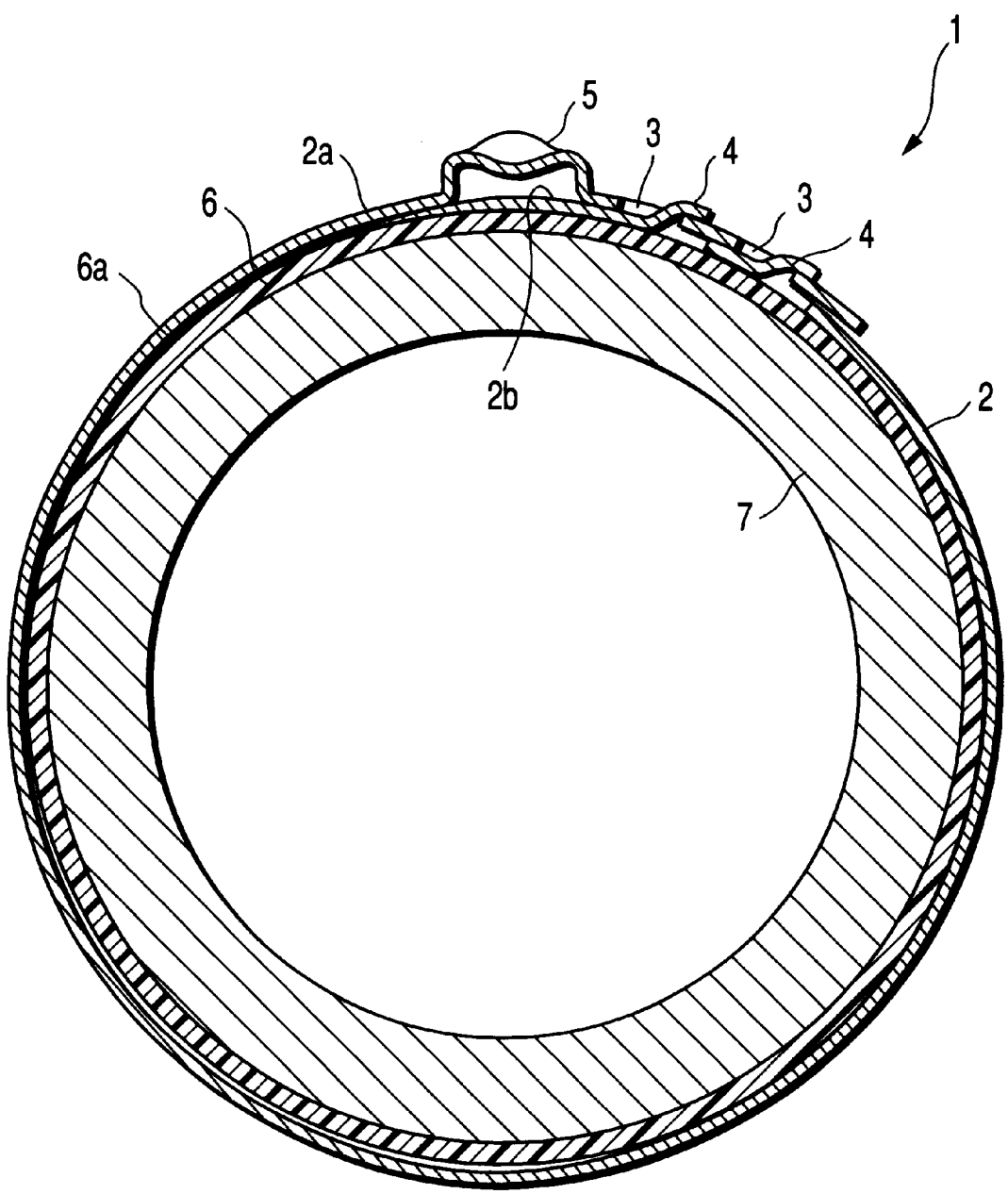
FIG. 19 is a sectional view showing a conventional boot band.

A narrow portion 70 is formed at the intermediate portion in the longitudinal of the elongated hole 60. This restrains the projection 61 from returning from the front end 60a to the rear end 60b of the elongated hole 60. As is schematically shown in FIG. 18, a width W5 of the narrow portion 70 at the narrowest portion is smaller than a width W6 of the projection 61 by 0.05 mm to 0.15 mm. The projection 61 can move in the longitudinal direction of the elongated hole 60 between a disengaging position P1 indicated by a solid line in FIG. 18, and an engaging position P3 indicated by an alternate long and two short dashed line in FIG. 18.

The narrow portion 70 is formed at an intermediate position P2 between the disengaging position P1 and engaging position P3. A tilted guide surface 71 is formed on the inner side surface of the elongated hole 60, so that the width of the elongated hole 60 decreases gradually from the rear end 60b side of the elongated hole 60 toward the narrow portion 70. Because of the tilted guide surface 71, the projection 61 can easily pass through the narrow portion 70 from the disengaging position P1 side.

A perpendicular surface 61a is formed on the outer surface of the projection 61 to stand upright at a substantially right angle from the surface of the band body 11 in the direction of thickness. The perpendicular surface 61a is in contact with the inner side surface of the narrow portion 70. A support wall 61b that can come into contact with the front end 60a of the elongated hole 60 is formed on the front surface side of the projection 61. When an ear portion 30 is caulked, the fastening force acting on the band body 11 in the longitudinal direction can be supported by the support wall 61b.

Except for the points described above, the arrangement, operation, and effect of the boot band 10B according to the third embodiment are common to the boot band 10 according to the first embodiment, and a detailed description thereof will accordingly be omitted. In practicing the present invention, the constituent elements of the present invention, e.g., the arrangements of the band body and boot, the shapes of the ear portion, locking hole, and locking nail, the arrangement of the narrow portion, the numbers of locking nails and locking holes, and the like, can naturally be modified appropriately without departing from the spirit of the present invention, as is represented by the above embodiments.

The present invention can be applied to a boot band which fixes a boot covering the joint portion of the driving shaft of a vehicle to a target connection member. Other than that, the present invention can also be applied to boot bands in various fields which fix a boot to a target connection member.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A boot band which comprises a metal band body having two open ends and which is to be mounted on a target fastening surface with the band body being round like a ring, comprising, a locking hole formed in an outer overlapping portion of the band body, a locking nail which is formed on an inner overlapping portion of the band body and, when being inserted in the locking hole, can move in a longitudinal direction of the locking hole between an engaging position to engage with a ridge of the locking hole and a disengaging position to disengage from the ridge, and an ear portion which is formed on part of the band body and can be plastically deformed into a shape that decreases a circumferential length of the rounded band body, wherein a narrow portion is formed at an intermediate portion in the longitudinal direction of the locking hole to restrain the locking nail from returning from the engaging position to a disengaging position side.

2. A boot band according to claim 1, wherein a width of the narrow portion at the narrowest portion is smaller than a width of the locking nail by 0.05 mm to 0.15 mm.

3. A boot band according to claim 1, wherein a perpendicular surface is formed on an outer surface of the locking nail to be perpendicular to a surface of the band body in a direction of thickness, the perpendicular surface being brought into contact with an inner side surface of the narrow portion.

4. A boot band according to claim 1, wherein a tilted guide surface is formed on an inner side surface of the locking hole to gradually decrease a width of the locking hole from the disengaging position side toward the narrow portion.

5. A boot band which comprises a metal band body having two open ends and which is to be mounted on a target fastening surface with the band body being round like a ring, comprising, a locking hole formed in an outer overlapping portion of the band body, a locking nail which is formed on an inner overlapping portion of the band body and, when being inserted in the locking hole, can move in a longitudinal direction of the locking hole between an engaging position to engage with a ridge of the locking hole and a disengaging position to disengage from the ridge, an elongated hole which is formed in the outer overlapping portion and extends in a longitudinal direction of the band body, a projection which is formed on the inner overlapping portion and to be inserted in the elongated hole, the projection serving to move to a front end side of the elongated hole when the locking nail moves to the engaging position, and to a rear end side of the elongated hole when the locking nail moves to the disengaging position, and an ear portion which is formed on part of the band body and can be plastically deformed into a shape that decreases a circumferential length of the rounded band body, wherein a narrow portion is formed at an intermediate portion in the longitudinal direction of the elongated hole to restrain the projection from returning from the front end side to the rear end side of the elongated hole.

6. A boot band according to claim 5, wherein a width of the narrow portion at the narrowest portion is smaller than a width of the projection by 0.05 mm to 0.15 mm.

7. A boot band according to claim 5, wherein a perpendicular surface is formed on an outer surface of the projection to be perpendicular to a surface of the band body in a direction of thickness, the perpendicular surface being brought into contact with an inner side surface of the narrow portion.

8. A boot band according to claim 5, wherein a tilted guide surface is formed on an inner side surface of the elongated hole to gradually decrease a width of the elongated hole from the rear end side of the elongated hole toward the narrow portion.

* * * * *